United States Patent
Ishihara

(10) Patent No.: US 7,154,640 B2
(45) Date of Patent: Dec. 26, 2006

(54) MULTI-BEAM SCANNING APPARATUS AND IMAGE FORMING APPARATUS USING THE SAME

(75) Inventor: Keiichiro Ishihara, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 892 days.

(21) Appl. No.: 10/244,464

(22) Filed: Sep. 17, 2002

(65) Prior Publication Data

US 2003/0063182 A1     Apr. 3, 2003

(30) Foreign Application Priority Data

Oct. 1, 2001   (JP) ............................. 2001/305582

(51) Int. Cl.
*H04N 1/04* (2006.01)
(52) U.S. Cl. ............... 358/474; 347/233; 347/225; 347/229; 347/231; 347/234; 347/235; 347/241; 347/243; 347/248; 347/250; 347/224; 358/412; 358/475; 358/505; 358/296; 358/471; 358/401; 358/409; 358/410
(58) Field of Classification Search ............... 358/474, 358/487, 486, 505, 481, 480; 347/234, 235, 347/248, 250, 233
See application file for complete search history.

(56) References Cited

U.S. PATENT DOCUMENTS 6,166,376 A * 12/2000 Kamioka .............. 250/235
6,362,470 B1 * 3/2002 Yoshida et al. .......... 250/235
2003/0043441 A1 * 3/2003 Azami et al. ............. 359/204

FOREIGN PATENT DOCUMENTS

| JP | 10-151796 | 6/1998 |
| JP | 10-228149 | 8/1998 |
| JP | 11-242171 | 9/1999 |
| JP | 2000-131634 | 5/2000 |
| JP | 2000-284194 | 10/2000 |

* cited by examiner

*Primary Examiner*—Twyler Lamb
*Assistant Examiner*—Benjamin Dulaney
(74) *Attorney, Agent, or Firm*—Fitzpatrick, Cella, Harper & Scinto

(57) ABSTRACT

This invention is to obtain a multi-beam scanning apparatus which always executes synchronization detection at the same timing to prevent any jitter, and an image forming apparatus using the apparatus. In a multi-beam scanning apparatus which guides a plurality of light beams emitted from a light source to an optical deflector, guides the plurality of light beams deflected by the optical deflector onto a target scanning surface through a scanning lens system, and guides some of the plurality of light beams deflected by the optical deflector to a synchronization detecting unit to execute synchronization using a sync signal obtained by the synchronization detecting unit, the synchronization detecting unit includes a BD slit which determines the synchronization detecting timing, and the BD slit has a smooth member.

12 Claims, 11 Drawing Sheets

MULTI-BEAM SCANNING APPARATUS AND IMAGE FORMING APPARATUS USING THE SAME

BACKGROUND OF THE INVENTION

1. Field of the Invention

The present invention relates to a multi-beam scanning apparatus and an image forming apparatus using the same and, more particularly, to a light scanning optical system suitable for an image forming apparatus such as a laser beam printer, digital copying machine, or multifunctional printer having, e.g., an electrophotographic process in which a light beam emitted from a light source means is reflected and deflected by a polygon mirror serving as a deflection means to optically scan a target scanning surface through a scanning optical means, thereby recording image information. The present invention especially relates to a multi-beam scanning apparatus which simultaneously optically scans a plurality of light beams to increase the speed and resolution to always obtain a satisfactory image with low jitter.

2. Related Background Art

A conventional multi-beam scanning apparatus has a synchronization detecting means to accurately determine the write start position on a target scanning surface, i.e., a photosensitive image carrier. The synchronization detecting means has a photodetection element (BD sensor) for detecting incidence of a light beam (BD light beam) for synchronization detection and a slit (BD slit) for determining the synchronization position at which the light beam becomes incident on the BD sensor.

In this synchronization detecting means, some components (BD light beams) of a plurality of light beams reflected and deflected by a deflection means (optical deflector) optically scan the BD slit and reach the BD sensor when the light beams come near the opening portion of the BD slit. That is, the BD slit serves as a synchronization position determination means for determining the timing of synchronization detection. In some arrangements, an edge of a BD sensor is used as a synchronization position determination means in place of a BD slit.

Japanese Patent Laid-Open Application No. 2000-284194 discloses an arrangement example of a synchronization detecting means in which jitter that occurs when synchronization detecting light components (BD light beams) have a light quantity difference is corrected by tilting the slit of the synchronization detecting means by a predetermined angle.

Japanese Patent Laid-Open Application No. 10-151796 discloses another arrangement example of a synchronization detecting means in which the front edge of the light-receiving portion of a beam detection means is almost perpendicular to the main scanning direction, and the width of the light-receiving portion of the beam detection means is smaller than the gap between a plurality of beams LD1 and LD2 in the main scanning direction.

For these multi-beam scanning apparatuses, it is not mentioned that jitter generation amount changes depending on the smoothness of the synchronization position determination means.

To record high-resolution image information by a multi-beam scanning apparatus of this type, it is important that the plurality of light beams focus across the target scanning surface, and jitter (print position shift in the main scanning direction) is satisfactorily corrected.

However, if the edge of the BD slit or the edge of the BD sensor, which serves as the synchronization position determination means, is uneven because of any structural reason or a manufacturing error, the synchronization detection timing shifts relatively. This poses a problem because the timing shift generates jitter on the target scanning surface.

Note that jitter indicates a print position shift in the main scanning direction due to the difference between scanning line write start positions corresponding to the plurality of BD light beams.

It is an object of the present invention to provide a multi-beam scanning apparatus capable of always obtaining a satisfactory image without any jitter on a target scanning surface due to the smoothness of the edge of a BD slit or the edge of a BD sensor, which serves as a synchronization position determination means, and an image forming apparatus using the multi-beam scanning apparatus.

SUMMARY OF THE INVENTION

The present invention accordingly has as its object to solve the problems described above. An aspect of the present invention is provided a multi-beam scanning apparatus which guides a plurality of light beams emitted from light source means to deflection means, guides the plurality of light beams deflected by the deflection means onto a target scanning surface through scanning optical means, and guides some of the plurality of light beams deflected by the deflection means to synchronization detecting means to execute synchronization using a sync signal obtained by the synchronization detecting means, wherein the synchronization detecting means comprises synchronization position determination means for determining a timing of synchronization detection, the synchronization position determination means having a smooth member.

Preferably, the synchronization position determination means is formed by attaching a basic member and a smooth member smoother than the basic member.

Preferably, letting Lm (mm) be a main-scanning unevenness difference of the synchronization position determination means, and Am (dpi) be a main-scanning pixel density on the target scanning surface, a condition given by $$Lm \leq 25.4/Am/3$$

is satisfied.

Preferably, the apparatus further comprises synchronization detection optical means separated from the scanning optical means in an optical path from the deflection means to the synchronization detecting means, and letting fk (mm) be a main-scanning focal length of the scanning optical means, fb (mm) be a main-scanning focal length of the synchronization detection optical means, Lm (mm) be a main-scanning unevenness difference of the synchronization position determination means, and Am (dpi) be a main-scanning pixel density on the target scanning surface, a condition given by $$Lm \leq (25.4/Am/3) \times (fb/fk)$$

is satisfied.

Preferably, the synchronization detection optical means includes an optical element having an anamorphic condensing function.

Preferably, letting Ls (mm) be a sub-scanning unevenness pitch of the synchronization position determination means, and Ws (mm) be a sub-scanning spot diameter of the light beam on the synchronization position determination means, a condition given by $$Ls \leq Ws/3$$

is satisfied.

Preferably, the synchronization position determination means is a slit having a light-shielding wall in the main scanning direction.

Preferably, the synchronization detecting means has a photodetecting element, and an edge of the photodetecting element forms part of the synchronization position determination means.

Preferably, the smooth member of the synchronization position determination means is formed from a light-shielding wall on a scanning start side of the light beam.

Preferably, a quantity of passing light on a scanning start side is limited by the smooth member of the synchronization position determination means.

Preferably, there is provided an image forming apparatus comprising the multi-beam scanning apparatus, a photosensitive body arranged on the target scanning surface, a developing unit which develops, as a toner image, an electrostatic latent image formed on the photosensitive body by the light beam scanned by the multi-beam scanning apparatus, a transfer unit which transfers the developed toner image on a target transfer material, and a fixing unit which fixes the transferred toner image on the target transfer material.

Preferably, there is provided an image forming apparatus comprising the multi-beam scanning apparatus, and a printer controller which converts code data input from an external device into an image signal and inputs the image signal to the multi-beam scanning apparatus.

Preferably, there is provided a color image forming apparatus comprising a plurality of multi-beam scanning apparatuses each comprising the multi-beam scanning apparatus, and a plurality of image carriers arranged on target scanning surfaces of the multi-beam scanning apparatuses to form images of different colors.

Preferably, the apparatus further comprises a printer controller which converts color signals input from an external device into image data of different colors and inputs the image data to the multi-beam scanning apparatuses.

DETAILED DESCRIPTION OF THE PREFERRED EMBODIMENTS (First Embodiment)

Figure 1:
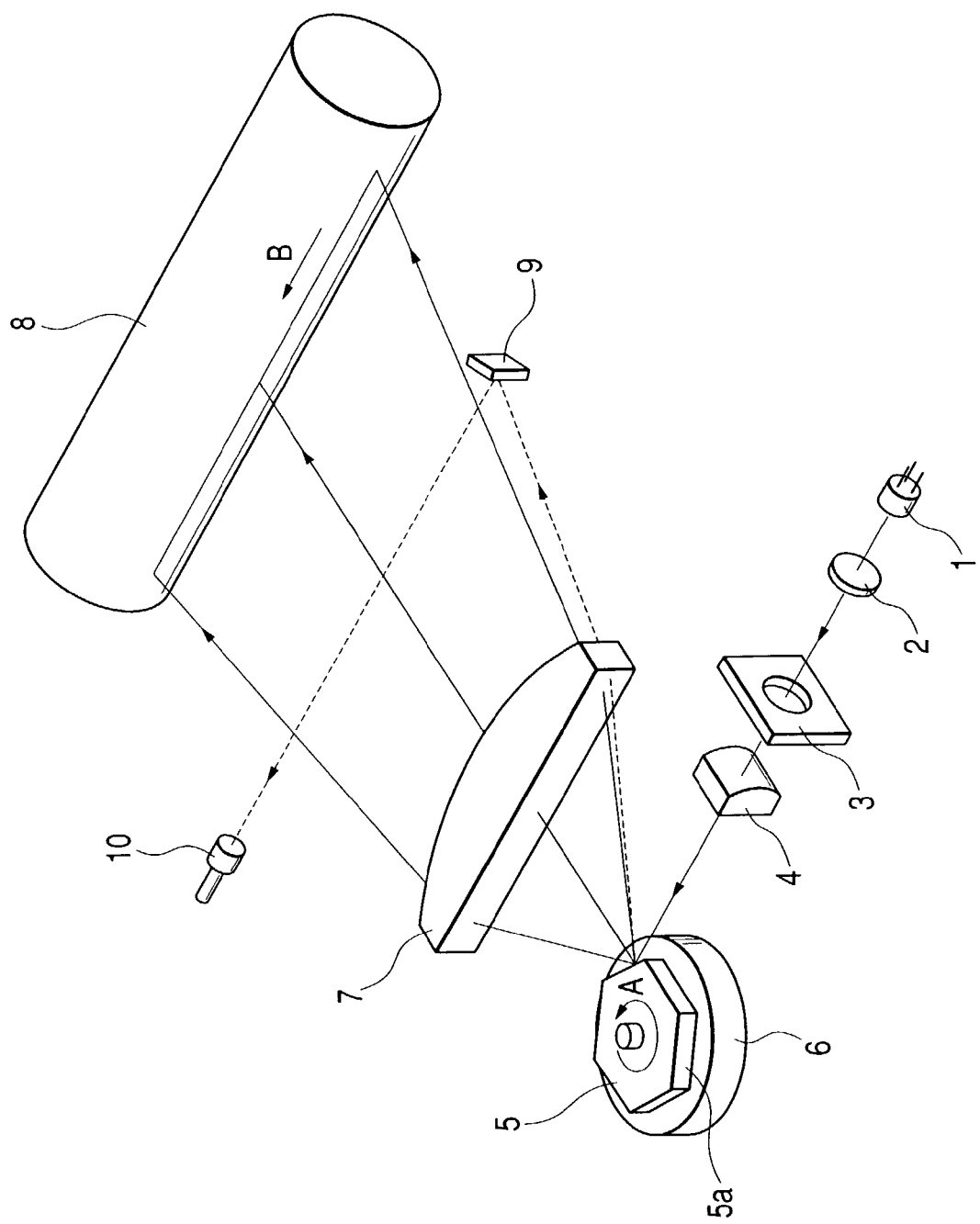
FIG. 1 is a perspective view of the main part of a multi-beam scanning apparatus according to the first embodiment of the present invention.

FIG. 1 is a perspective view of the main part of a multi-beam scanning apparatus according to the first embodiment of the present invention.

This specification defines that a direction in which a light beam is reflected and deflected (deflected and scanned) by a deflection means is the main scanning direction, and a direction perpendicular to the optical axis of a scanning optical means and the main scanning direction is the sub-scanning direction.

Referring to FIG. 1, a light source means 1 is formed from a semiconductor laser array having, e.g., four light-emitting points (light-emitting portions). The number of light-emitting points is not limited to four, and any other number of (two or more) light-emitting points may be used.

A condenser lens system 2 has one collimator lens and converts each of the four light beams emitted from the light source means 1 into a parallel beam. The condenser lens system may be made of a plurality of lenses. The condenser lens system may convert the four light beams emitted from the light source means 1 into divergent light beams or convergent light beams, as needed.

An aperture stop 3 limits the width of each of the four light beams emitted from the light source means 1.

A cylindrical lens 4 has a predetermined refracting power only in the sub-scanning direction. The cylindrical lens 4 forms the four light beams that have passed through the collimator lens 2 into linear images long in the main scanning direction near a deflecting surface 5a of a deflection means 5 (to be described later).

The optical deflector 5 serving as a deflection means is formed from a polygon mirror (rotary polyhedral mirror) having, e.g., a hexahedral structure. The optical deflector 5 is rotated by a driving means 6 such as a motor at a predetermined speed in a direction indicated by an arrow A in FIG. 1.

A scanning optical means (scanning lens system) 7 has imaging performance and f-θ characteristic. The scanning optical means 7 has one lens (f-θ lens) having an anamorphic refracting power. The scanning optical means 7 forms the images of the four light beams reflected and deflected by the optical deflector 5 on a photosensitive drum surface 8 serving as a target scanning surface and also corrects the face tangle error of the deflecting surface 5a of the optical deflector 5.

At this time, the four light beams (scanning light beams) reflected and deflected by the deflecting surface 5a of the optical deflector 5 are guided into the photosensitive drum surface 8 through the scanning optical means 7 and simultaneously optically scan the photosensitive drum surface 8 in a direction of an arrow B (main scanning direction) as the optical deflector 5 rotates in the direction of the arrow A. Accordingly, for scanning lines are formed on the photosensitive drum surface 8 to record an image.

In addition, some components (BD light beams: synchronization detecting light beams) of the four light beams reflected and deflected by the optical deflector 5 are reflected by a synchronization detecting mirror (BD mirror) 9 through the scanning optical means 7 and become incident on a synchronization detecting means 10. The synchronization detecting means 10 detects the four incident BD light beams and measure the timings, thereby aligning the write start positions on the photosensitive drum surface 8.

Figure 2:
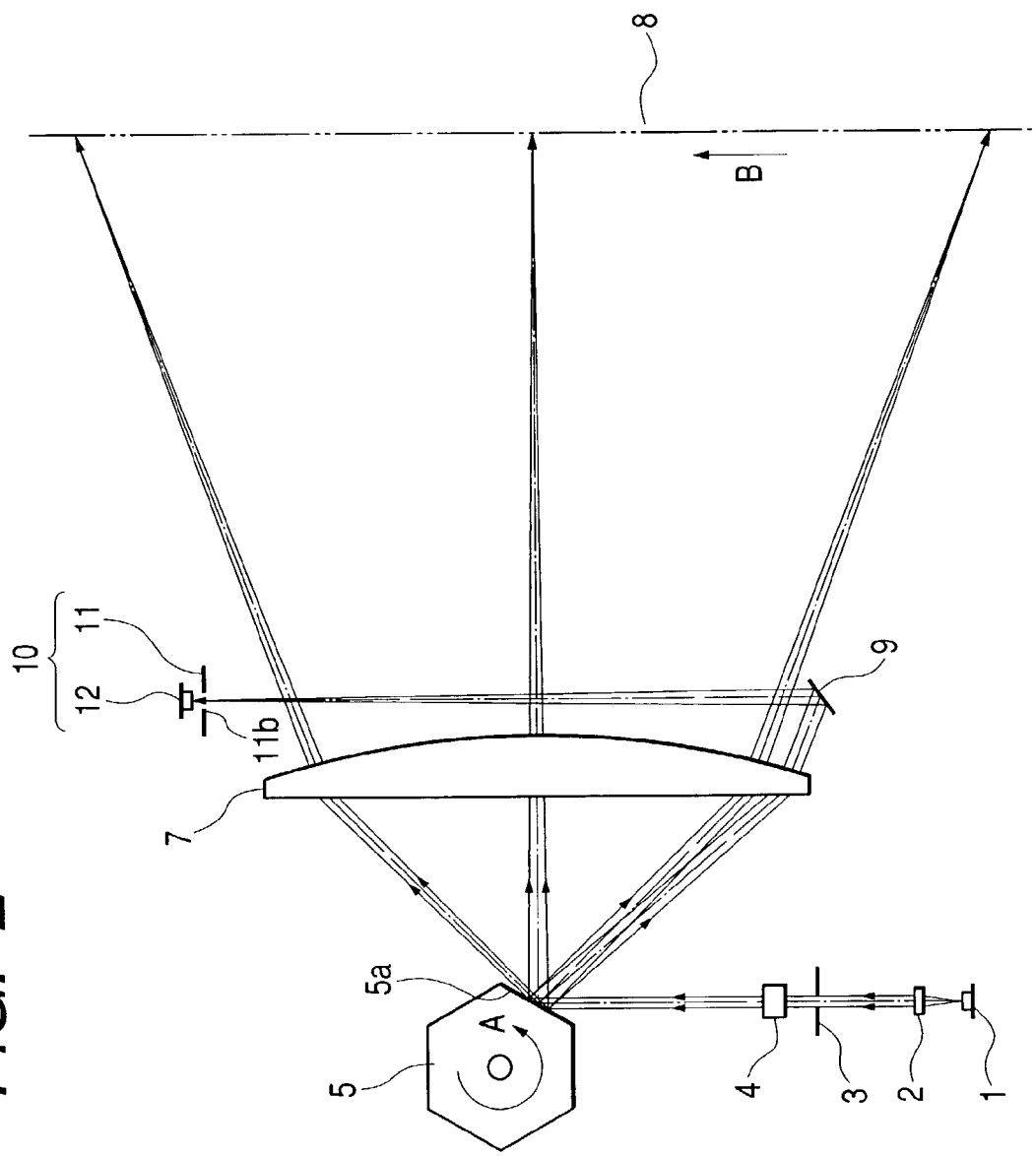
FIG. 2 is a main-scanning sectional view of the multi-beam scanning apparatus according to the first embodiment.

FIG. 2 is a sectional view (main scanning sectional view) of the main part of the multi-beam scanning apparatus according to the first embodiment along the main scanning direction. The same reference numerals as in FIG. 1 denote the same elements in FIG. 2.

Referring to FIG. 2, the synchronization detecting means 10 is formed from a slit (BD slit) 11 which serves as a synchronization position determination means for determining the synchronization detecting timing and has a light-shielding wall (BD slit portion) in the main scanning direction, and a BD sensor 12 serving as a photodetecting element. In this embodiment, the light-shielding wall of the BD slit 11 is made of a smooth member.

Each BD light beam incident on the synchronization detecting means 10 scans the light-shielding wall of the BD slit 11 and becomes incident on the BD sensor 12 near an aperture portion 11b. The BD sensor 12 photodetects (BD-detects) the incident BD light beam and starts light emission a predetermined time T after the photodetection, thereby aligning the write start positions on the photosensitive drum surface 8 serving as a target scanning surface.

In this embodiment, of the four BD light beams, a BD light beam precedingly scanned is turned on first. After photodetection by the BD sensor 12, the BD light beam is turned off. Then, a BD light beam to be scanned next is turned on and photodetected by the BD sensor 12. This process is sequentially repeated to execute synchronization detection of the four BD light beams. The predetermined time T from photodetection of a BD light beam to the start of write equals between the four BD light beams. That is, the four BD light beams are arranged at equal main-scanning intervals both on the BD slit 11 and on the photosensitive drum surface 8.

Figure 3:
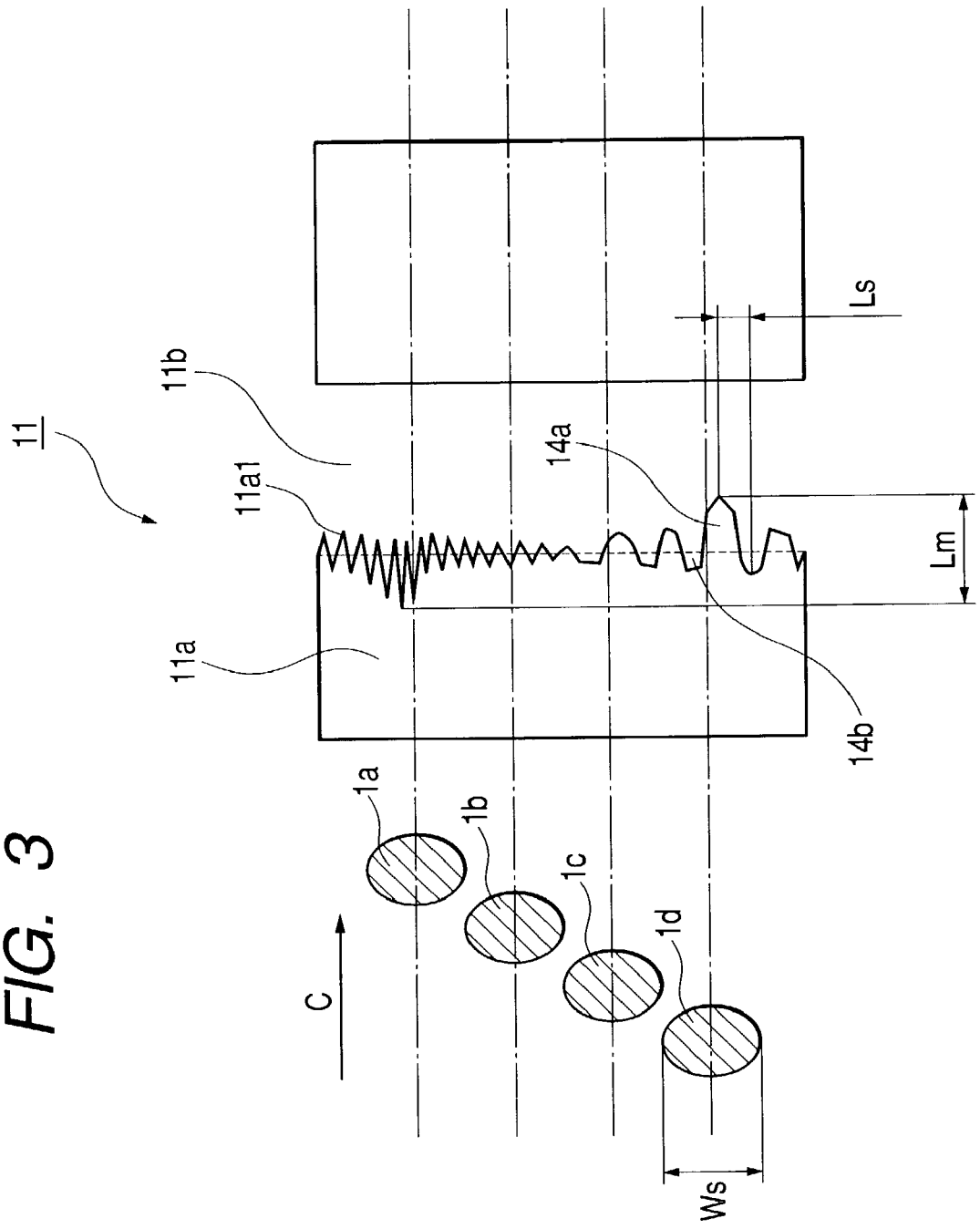
FIG. 3 is a schematic view of a slit.

FIG. 3 is a sectional view of the main part of the BD slit serving as a synchronization position determination means shown in FIGS. 1 and 2. The same reference numerals as in FIG. 2 denote the same elements in FIG. 3.

Referring to FIG. 3, four BD light beams 1a to 1d are optically scanned in a direction of an arrow C in FIG. 3 and photodetected by the BD sensor (not shown) near the aperture portion 11b of the BD slit 11.

A conventional BD slit is formed integrally with an optical box on which an optical deflector, scanning lens system, and the like are mounted. Since this optical box uses a plastic material into which glass fibers are mixed to increase the rigidity, the glass fibers deposit at the edge of the light-shielding wall of the BD slit, resulting in a rough surface.

For example, assume that an edge 11a1 of a light-shielding wall 11a is not smooth and has unevenness. At a convex portion 14a, the aperture portion 11b of the BD slit 11 is narrow. At a concave portion 14b, the aperture portion 11b of the BD slit 11 is wide. Hence, the photodetecting timing shifts due to the shape of the BD slit 11. In addition, the write start position on the photosensitive drum surface 8 also shifts in accordance with the shape of the BD slit 11.

In the multi-beam scanning apparatus, since the plurality of BD light beams are scanned at different positions on the BD slit 11, the photodetecting timing shift amount influenced by the shape of the BD slit 11 changes between the light beams. Each BD light beam has a corresponding scanning line, and the write start position varies between the scanning lines. This phenomenon poses the problem of jitter.

In this embodiment, to improve the smoothness of the edge 11a1 of the light-shielding wall (BD slit portion) 11a, the light-shielding wall is formed at a lower molding temperature and an accuracy without any substantial problem while preventing glass fibers from exposure to the edge 11a1 of the light-shielding wall 11a. This invention therefore solves the above problem.

As a detailed structure, let Am (dpi) be the pixel density on the photosensitive drum surface 8 in the main scanning direction. At this time, an unevenness difference Lm (mm) of the BD slit 11 in the main scanning direction satisfies a condition given by $$Lm \leq 25.4/Am/3 \qquad (1)$$

More preferably, the unevenness difference Lm satisfies a condition given by $$Lm \leq 25.4/Am/5 \qquad (2)$$

Outside the range of condition (1), the jitter increases to more than an allowable level.

In this embodiment, the pixel density on the photosensitive drum surface 8 in the main scanning direction is Am=600 (dpi), and the main-scanning unevenness difference that indicates the smoothness of the BD slit 11 is Lm=0.008 (mm). This structure satisfies condition (1) and also more preferable condition (2).

In the present invention, the main-scanning unevenness difference representing the smoothness of the BD slit 11 means the difference between the highest projecting portion and the lowest recessed portion in the main scanning direction (Lm in FIG. 3).

Figure 4:
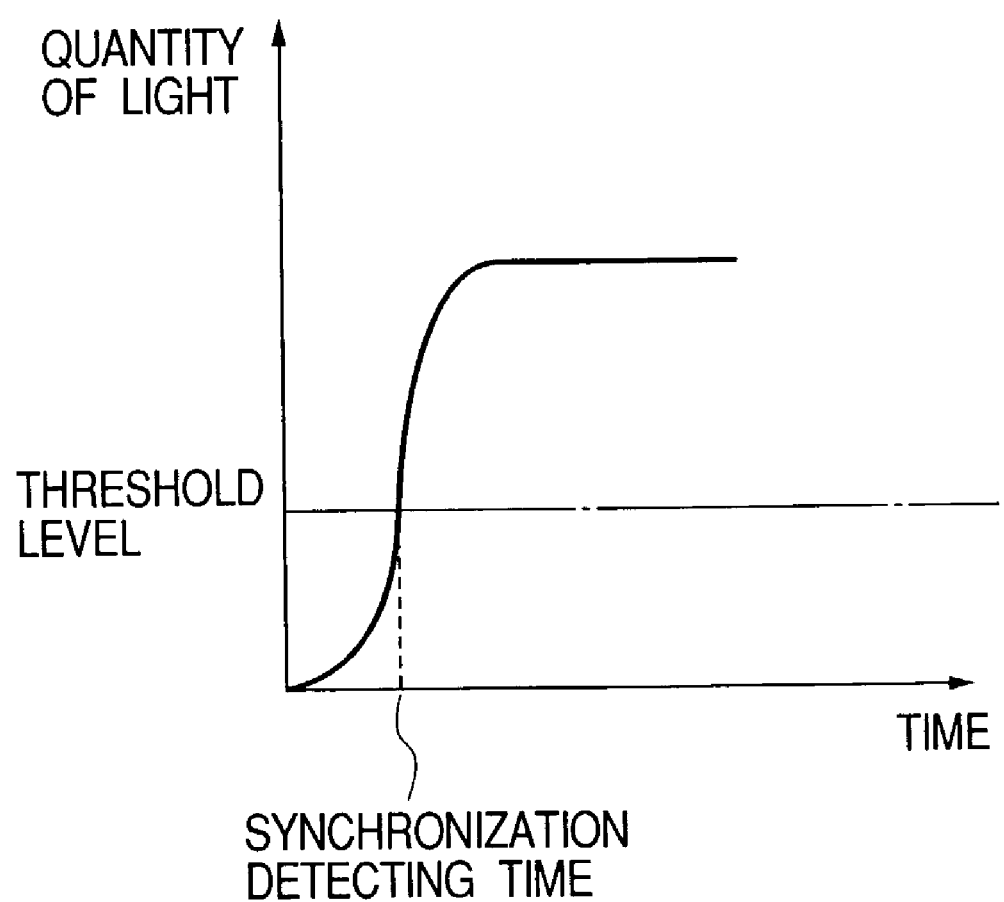
FIG. 4 is a graph for explaining a synchronization detecting method.

FIG. 4 is a graph for explaining the synchronization detecting method at the BD sensor serving as a photodetecting element. Referring to FIG. 4, the abscissa represents the time after the start of incidence of a BD light beam onto the BD sensor 12, and the ordinate represents the detected quantity of light.

The BD sensor 12 determines the photodetecting timing on the basis of a threshold level. The BD sensor 12 used in this embodiment sets, as the threshold level, a quantity of light of 40% with respect to the peak value of the total quantity of incident light. The synchronization detecting timing is set at the moment when the output of the BD sensor 12 has reached this quantity of light.

On the BD slit 11 shown in FIG. 3, each of the four BD light beams 1a to 1d forms a spot image. Since the area of the spot image of each BD light beam is very small, the quantity of light eclipsed by the small unevenness at the edge 11a1 of the light-shielding wall 11a becomes relatively large. If the projecting portion (convex portion) 14a of the BD slit 11 is wide in the sub-scanning direction and covers most part of a spot, most quantity of light is eclipsed by the projecting portion 14a of the BD slit 11. Hence, the quantity of light detected by the BD sensor 12 does not reach the threshold level. The quantity of light exceeds the threshold level for the first time at a position where the spot has passed the projecting portion 14a, and synchronization detection is executed.

If the projecting portion 14a of the BD slit 11 is narrow in the sub-scanning direction and only partially covers a spot, the quantity of light eclipsed by the projecting portion 14a of the BD slit 11 is small. Hence, the quantity of light reaches the threshold level of the BD sensor 12 halfway in scanning on the projecting portion 14a, and synchronization detection is executed.

As described above, when the sub-scanning width (roughness) of the projecting portion 14a changes depending on the position on the BD slit 11, the position at which the quantity of light exceeds the threshold level changes between the scanning lines. As a result, the write start positions are not aligned, and jitter is generated. Even if the recessed portion (concave) 14b is present in place of the projecting portion 14a, jitter is still generated although the timing is reversed.

In this embodiment, an unevenness pitch Ls in the sub-scanning direction of the BD slit 11 is suppressed to a predetermined ratio or less with respect to the spot diameter. Note that the unevenness pitch Ls indicates the sub-scanning interval between the apex of a certain projecting portion and the apex of an adjacent recessed portion, as shown in FIG. 3.

More specifically, in this embodiment, the sub-scanning light beam width (spot diameter) of a BD light beam on the BD slit 11 is Ws=0.070 (mm), and the sub-scanning unevenness pitch of the BD slit 11 is Ls=0.010 (mm). They satisfies a condition given by $$Ls \leq Ws/3 \qquad (3)$$

In this embodiment, the jitter is suppressed to a level without any practical problem by satisfying condition (1) or/and condition (3).

In this embodiment, the BD slit 11 has a linear shape parallel to the sub-scanning direction. However, the shape of the BD slit 11 is not limited to this. For example, the BD slit may be rotated from the state parallel to the sub-scanning direction and fixed. An arc (or elliptical) BD slit may be used. The effect of the present invention can sufficiently be obtained by improving the smoothness of the BD slit.

In this embodiment, instead of using the collimator lens 2, cylindrical lens 4, and the like, the light beam from the light source means 1 may be guided to the optical deflector 5 directly through the aperture stop 3.

In this embodiment, the scanning optical means is formed from one lens. However, the present invention is not limited to this. The scanning optical means may be formed from, e.g., two or more lenses.

(Second Embodiment)

Figure 5:
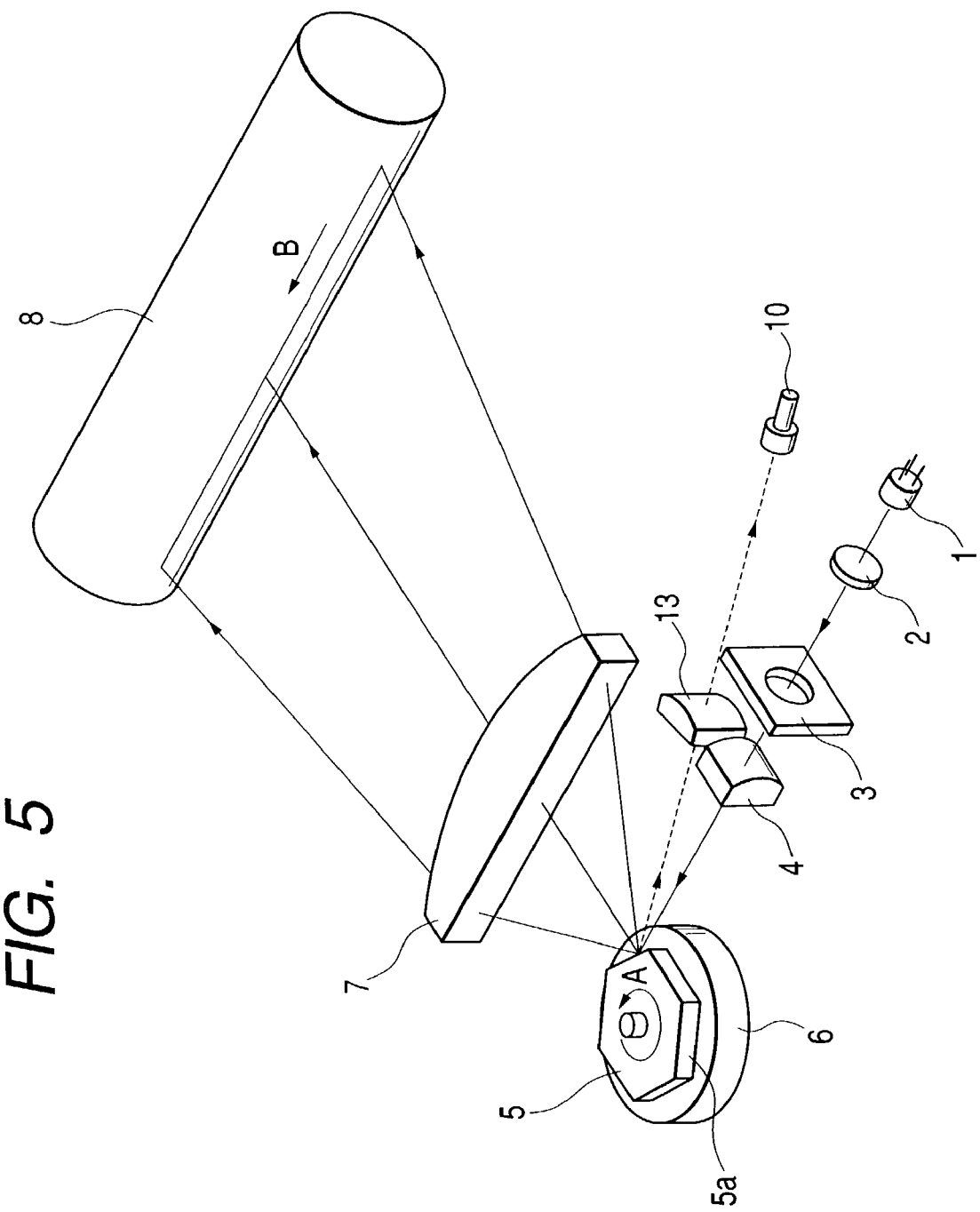
FIG. 5 is a perspective view of the main part of a multi-beam scanning apparatus according to the second embodiment of the present invention.
Figure 6:
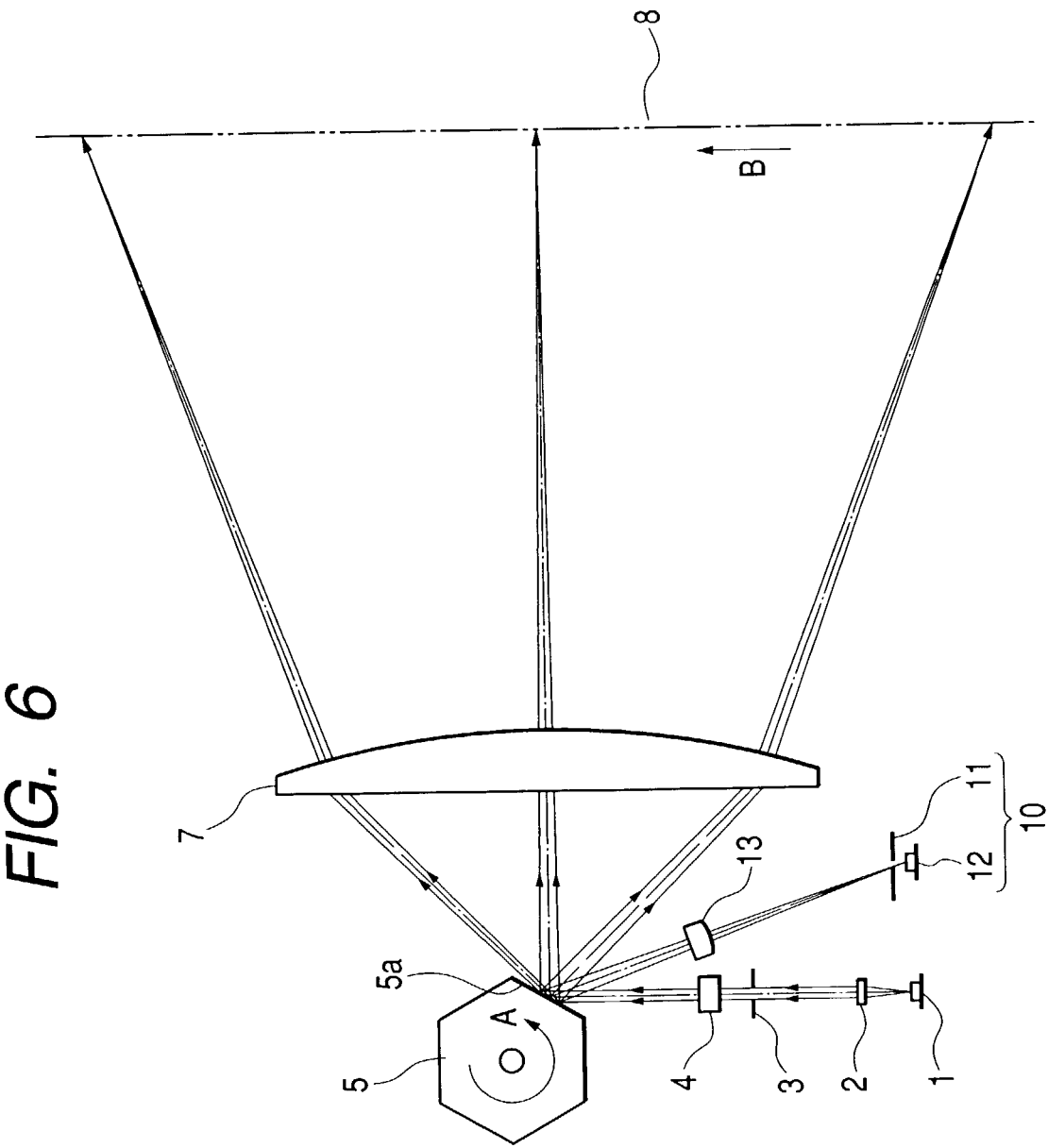
FIG. 6 is a main-scanning sectional view of the multi-beam scanning apparatus according to the second embodiment.

FIG. 5 is a perspective view of the main part of a multi-beam scanning apparatus according to the second embodiment of the present invention. FIG. 6 is a sectional view (main-scanning sectional view) of the main part of the multi-beam scanning apparatus according to the second embodiment. The same reference numerals as in FIGS. 1 and 2 denote the same elements in FIGS. 5 and 6.

The second embodiment is different from the first embodiment described above in that some components (BD light beams) of two light beams reflected and deflected by an optical deflector 5 are guided to a synchronization detecting means 10 not through a scanning optical means (scanning lens system) 7 but through a synchronization detection optical means 13 separated from the scanning optical means 7, and a BD mirror 9 is omitted to shorten the optical path length. The remaining components and optical functions are almost the same as those in the first embodiment whereby a similar effect is obtained.

Referring to FIGS. 5 and 6, the synchronization detection optical means 13 is formed from one synchronization detection lens (BD lens) having an anamorphic power, i.e., the power (refracting power) in the sub-scanning direction stronger than that in the main scanning direction, and guides some components (BD light beams) of two light beams reflected and deflected by the optical deflector 5 to the synchronization detecting means 10. Note that the synchronization detection optical means 13 may be formed from a plurality of lenses.

In this embodiment, the main-scanning focal length of the scanning lens system 7 is fk=109.00 (mm), and the main-scanning focal length of the BD lens 13 is fb=42.72 (mm).

When fk>fb, the optical path length from the optical deflector 5 to the synchronization detecting means 10 is shortened. Hence, the entire apparatus can be made compact.

At this time, a ratio M of the main-scanning focal length of the scanning lens system 7 to that of the BD lens 13 is given by $$M = fk/fb \qquad (4)$$

When synchronization detection is executed without intervening the scanning lens system 7, the speed of scanning on a BD slit 11 changes in inverse proportion to the proportional coefficient M of equation (4). As in this embodiment, when the main-scanning focal length fk of the scanning lens system 7 is longer than the main-scanning focal length fb of the BD lens 13, the scanning speed is low on the light source means 1 and high on a photosensitive drum surface 8.

This means that when an edge 11a1 of a light-shielding wall 11a has unevenness, the unevenness difference is multiplied to M times to generate jitter on the photosensitive drum surface 8. To suppress the jitter to the same amount as in the first embodiment, in consideration of equation (4), an unevenness difference Lm (mm) of the BD slit 11 must satisfy a condition given by $$Lm \leq (25.4/Am/3) \times (fb/fk) \qquad (5)$$

More preferably, a condition given by $$Lm \leq (25.4/Am/5) \times (fb/fk) \qquad (6)$$

In this embodiment, the jitter is suppressed to a level without any practical problem by satisfying condition (5) and condition (6).

(Modification)

Figure 7:
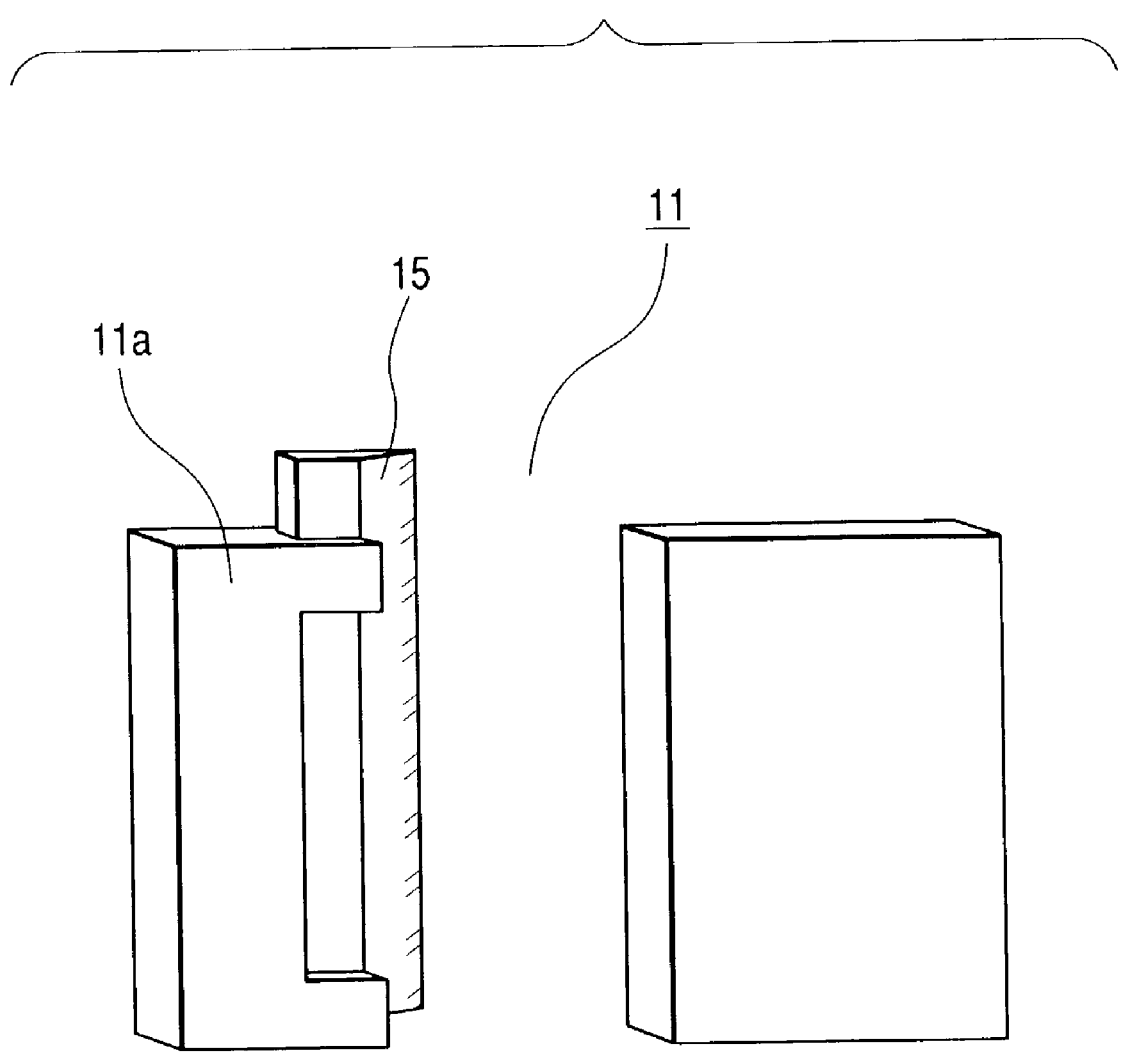
FIG. 7 is a schematic view of the main part of a synchronization position determination means in the second embodiment of the present invention.

FIG. 7 is a schematic view of the main part of the BD slit of a modification to the second embodiment. The same reference numerals as in FIG. 3 denote the same element in FIG. 7.

In this example, to improve the smoothness of an edge 11a1 of a light-shielding wall 11a of a BD slit 11, the member that forms the light-shielding wall of the BD slit 11 is formed from a smooth member 15 smoother than the basic member 11a.

More specifically, this smooth member 15 is a smooth knife edge made of a plastic (PC) containing no glass fibers. The main-scanning unevenness difference is Lm=0.003 (mm), and the sub-scanning unevenness difference is Ls=0.003 (mm).

In this example, the pixel density on a photosensitive drum surface 8 in the main scanning direction is Am=600 (dpi). This structure satisfies condition (5) and also more preferable condition (6). Hence, a multi-beam scanning apparatus which suppresses jitter to a level without any practical problem is constituted.

Some components (BD light beams) of the two light beams reflected and deflected by an optical deflector 5 form images on the BD slit 11 through a BD lens 13. The absolute value of the sub-scanning magnification of the BD lens 13 is smaller than that of the sub-scanning magnification of a scanning lens system 7. For this reason, the diameter of a spot formed on the BD slit 11 is also smaller than that in the first embodiment. The spot diameter is also smaller than that on the photosensitive drum surface 8.

At this time, the sub-scanning spot diameter on the BD slit 11 is Ws=0.027 (mm). Hence, the multi-beam scanning apparatus of this example has an arrangement that satisfies condition (3).

In this example, a plastic knife edge is used as the smooth member 15. However, the present invention is not limited to this. For example, when a knife edge made of a metal or vinyl (tape) is attached to the light-shielding wall 11a of the BD slit 11 as the smooth member to form the BD slit portion, the same effect as that of the present invention can be obtained.

(Third Embodiment)

Figure 8:
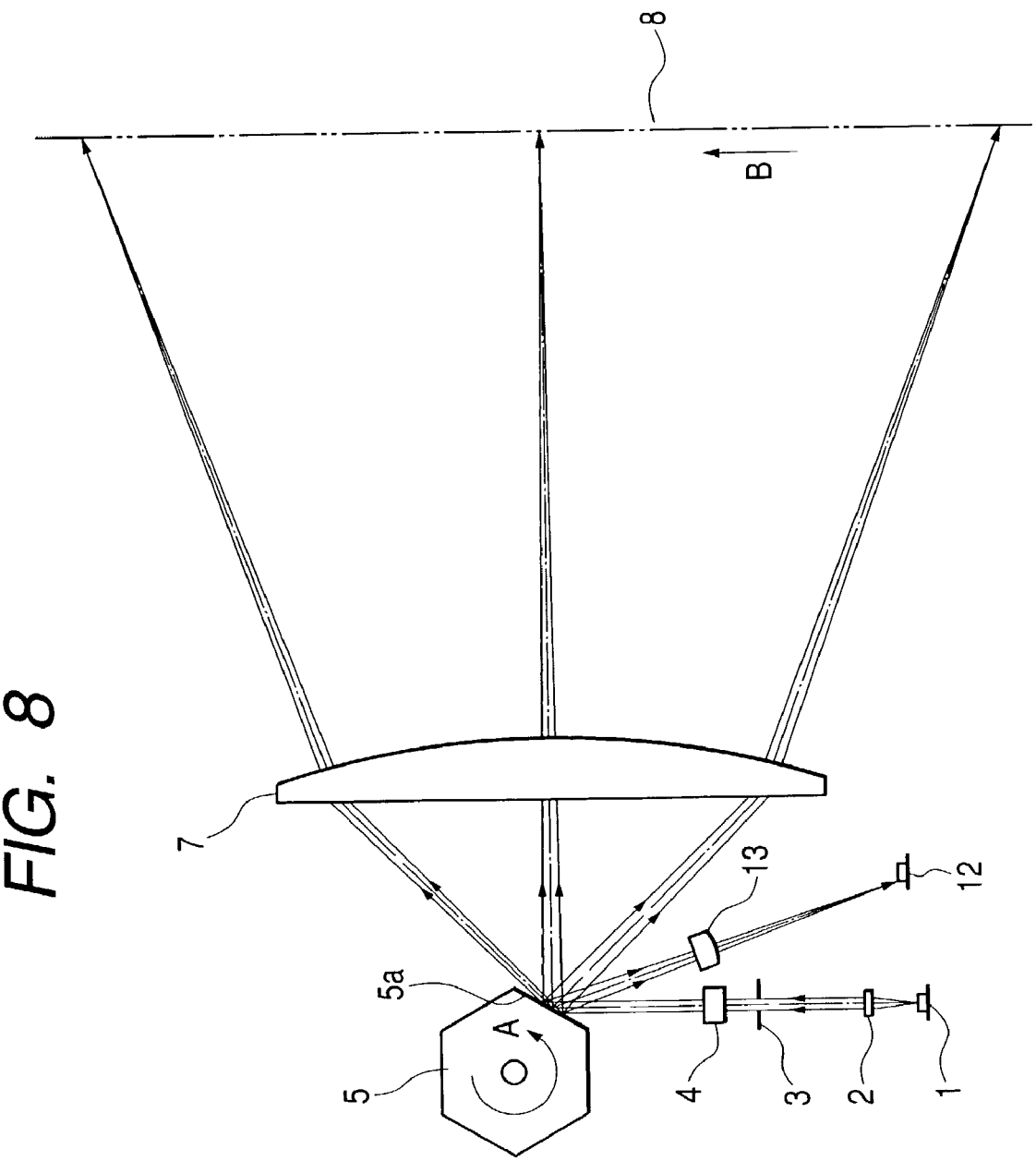
FIG. 8 is a main-scanning sectional view of a multi-beam scanning apparatus according to the third embodiment.
Figure 9:
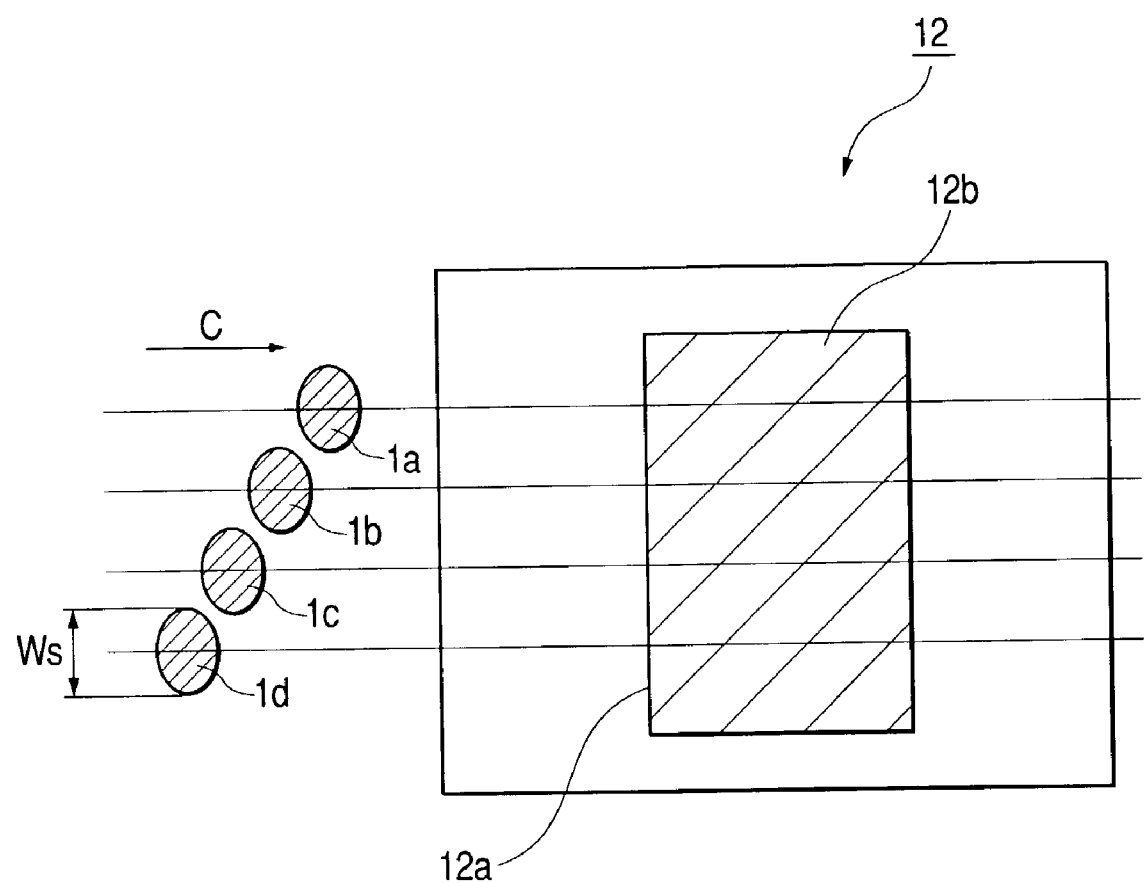
FIG. 9 is a front view of a BD sensor shown in FIG. 8 when viewed from the front side.

FIG. 8 is a sectional view (main-scanning sectional view) of the main part of a multi-beam scanning apparatus according to the third embodiment along the main scanning direction. FIG. 9 is a front view of a BD sensor shown in FIG. 8 when viewed from the front side. The same reference numerals as in FIG. 6 denote the same elements in FIGS. 8 and 9.

The third embodiment is different from the above-described second embodiment is that an edge of a BD sensor 12 is used as a synchronization position determination means, and the BD slit is omitted. The remaining components and optical functions are almost the same as those in the second embodiment whereby a similar effect is obtained.

More specifically, in this embodiment, an edge 12a of the BD sensor 12 is used as a synchronization position determination means, and the BD slit is omitted. With this arrangement, the number of components is decreased, and the entire apparatus is simplified (cost is reduced).

The BD sensor 12 shown in FIG. 9 has the edge 12a and light-receiving surface 12b.

In this embodiment, some components (BD light beams) of two light beams reflected and deflected by an optical deflector 5 form spot images on the BD sensor 12 through a BD lens 13. That is, some components (BD light beams) of two light beams reflected and deflected by the optical deflector 5 optically scan the BD sensor 12 through the BD lens 13. At this time, when synchronization detection of the BD light beam precedingly scanned is executed at the edge 12a of the BD sensor 12, the light beam is simultaneously turned off. At the same time, the other BD light beam is turned on, and synchronization detection is executed in the same manner. If the edge 12a of the BD sensor 12 is not smooth and has unevenness, jitter is generated on a photosensitive drum surface 8, resulting in a problem.

In this embodiment, the edge 12a of the BD sensor 12 is etched to improve the smoothness, thereby setting the unevenness difference in the main scanning direction to Lm=0.002 (mm). That is, condition (5) and condition (6) are satisfied by suppressing the main-scanning unevenness difference Lm of the edge 12a of the BD sensor 12. Accordingly, an image forming apparatus capable of always obtaining a satisfactory image without any jitter can be provided.

[Image Forming Apparatus]

Figure 10:
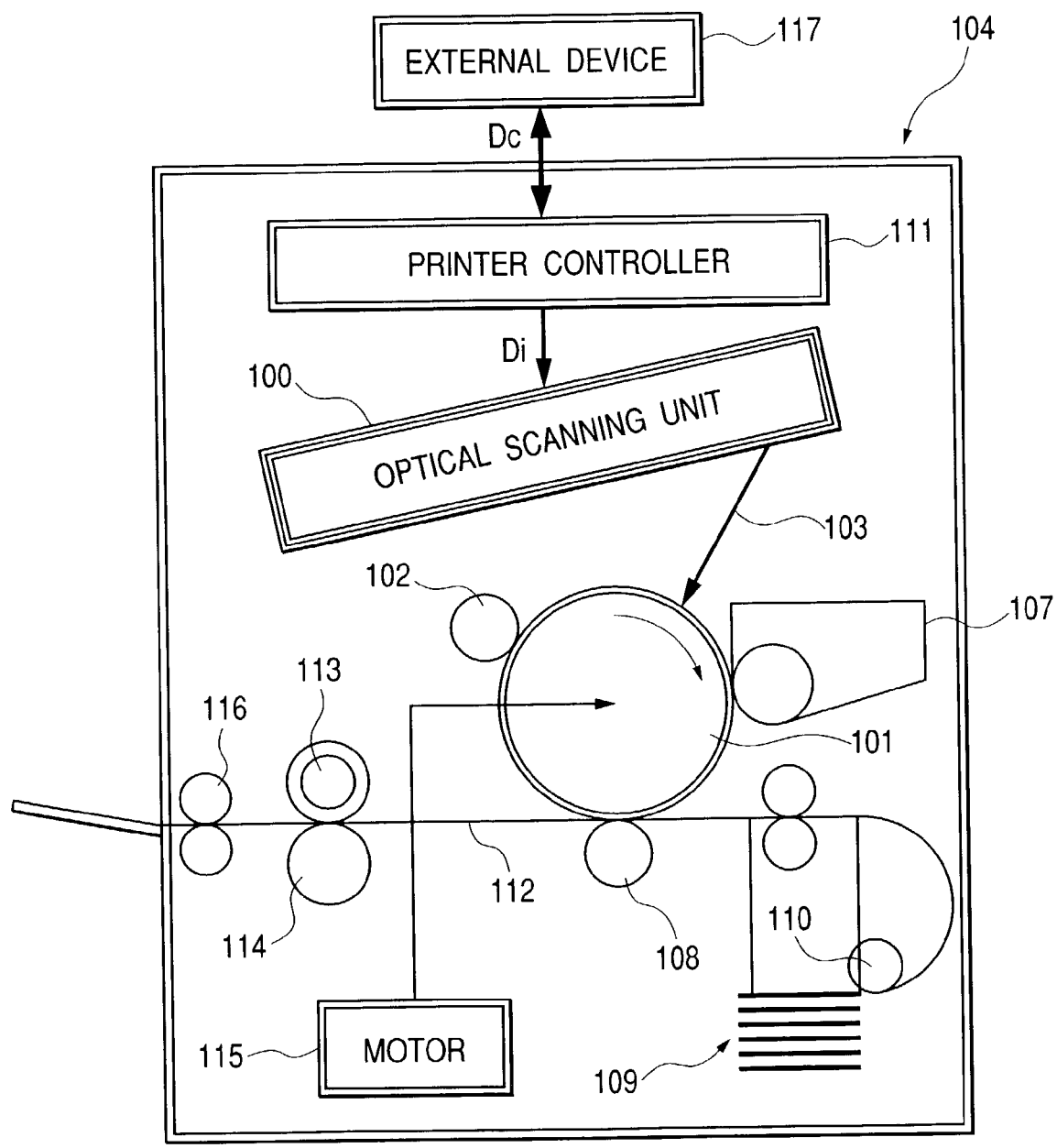
FIG. 10 is a sectional view of the main part of an image forming apparatus according to the present invention.

FIG. 10 is a sectional view of the sub-scanning section of the main part of an embodiment of an image forming apparatus (electrophotographic printer) using any one of the multi-beam scanning apparatuses of the above-described first to third embodiments.

Referring to FIG. 10, an image forming apparatus 104 receives code data Dc from an external device 117 such as a personal computer. The code data Dc is converted into image data (dot data) Di by a printer controller 111 in the apparatus. The image data Di is input to an optical scanning unit 100 having any one of the arrangements described in the first to third embodiments. A light beam 103 modulated in accordance with the image data Di exits the optical scanning unit (multi-beam scanning apparatus) 100. The photosensitive surface of a photosensitive drum 101 is scanned by the light beam 103 in the main scanning direction.

The photosensitive drum 101 serving as an electrostatic latent image carrier (photosensitive body) is rotated clockwise by a motor 115. In accordance with the rotation, the photosensitive surface of the photosensitive drum 101 moves relative to the light beam 103 in the sub-scanning direction perpendicular to the main scanning direction. A charging roller 102 for uniformly charging the surface of the photosensitive drum 101 is arranged above the photosensitive drum 101 while butting against the surface of the photosensitive drum 101. The surface of the photosensitive drum 101, which is charged by the charging roller 102, is irradiated with the light beam 103 scanned by the optical scanning unit 100.

As described above, the light beam 103 is modulated on the basis of the image data Di. An electrostatic latent image is formed on the surface of the photosensitive drum 101 by irradiating the surface with the light beam 103. This electrostatic latent image is developed as a toner image by a developing unit 107 which is arranged to butt against the photosensitive drum 101 on the downstream side of the irradiation position of the light beam 103 in the rotational section of the photosensitive drum 101.

The toner image developed by the developing unit 107 is transferred onto a paper sheet 112 serving as a target transfer member by a transfer roller (transfer unit) 108 arranged to oppose the photosensitive drum 101 under it. The paper sheet 112 is stored in a paper cassette 109 in front of (in FIG. 10, on the right side of) the photosensitive drum 101. Paper sheets can also manually be fed. A paper feed roller 110 is arranged at the end portion of the paper cassette 109 to feed the paper sheet 112 from the paper cassette 109 to the convey path.

In the above manner, the paper sheet 112 having an unfixed toner image transferred thereon is further conveyed to a fixing unit behind (in FIG. 10, on the left side of) the photosensitive drum 101. The fixing unit is formed from a fixing roller 113 having an internal fixing heater (not shown) and a press roller 114 pressed against the fixing roller 113. The paper sheet 112 conveyed from the transfer section is heated while being pressed by the press portion between the fixing roller 113 and the press roller 114, thereby fixing the unfixed toner image on the paper sheet 112. A discharge roller 116 is arranged behind the fixing roller 113 to discharge the paper sheet 112 bearing the fixed image externally from the image forming apparatus.

Although not illustrated in FIG. 10, the printer controller 111 controls not only data conversion described above but also the units in the image forming apparatus, including the motor 115, and the polygon motor and the like in the optical scanning unit 100.

[Color Image Forming Apparatus]

Figure 11:
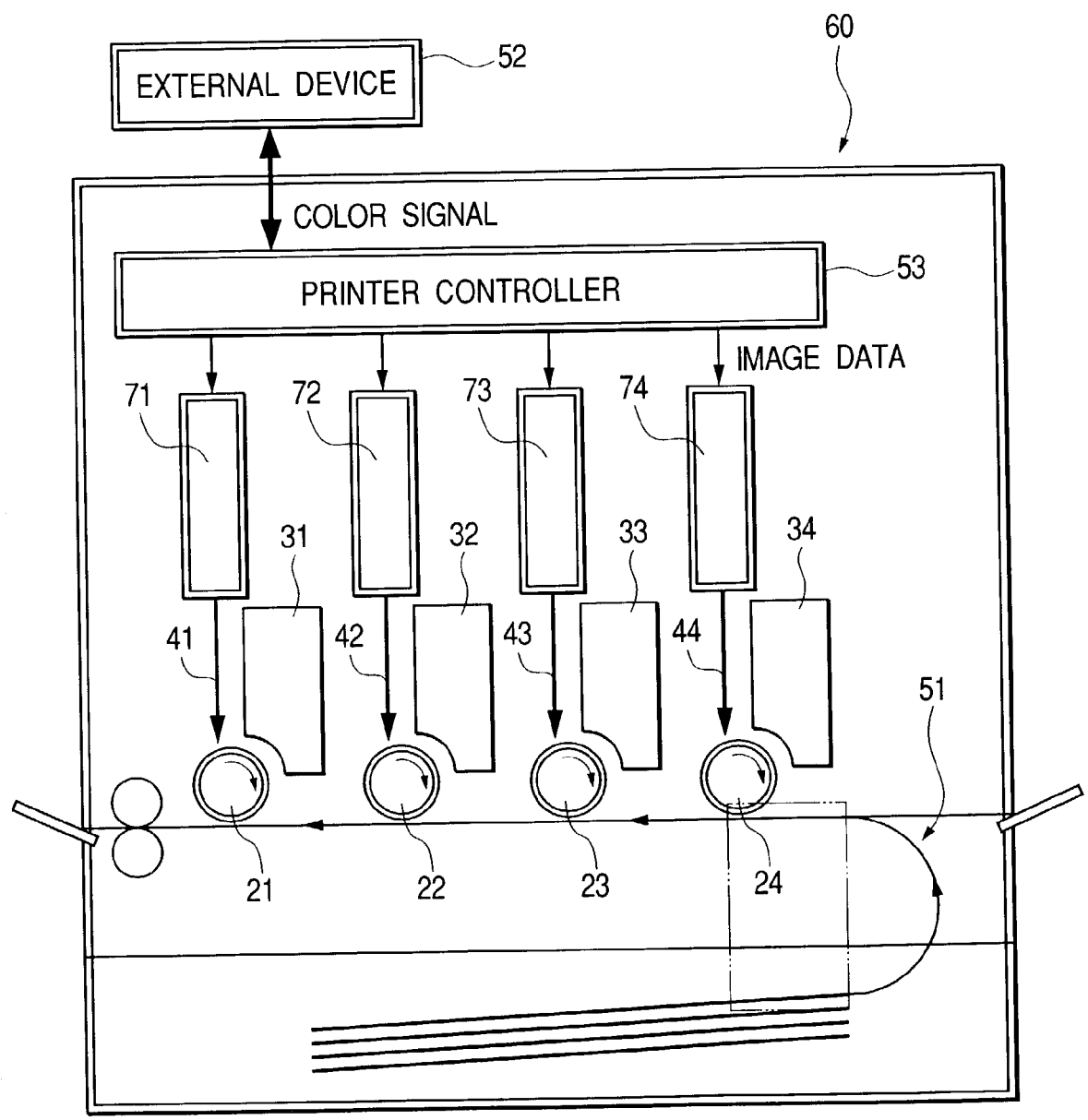
FIG. 11 is a sectional view of the main part of a color image forming apparatus according to the present invention.

FIG. 11 is a schematic view of the main part of a color image forming apparatus according to an embodiment of the present invention. This embodiment is a tandem-type color image forming apparatus in which four multi-beam scanning apparatuses are arranged to parallelly record image information on photosensitive drums serving as image carriers.

Referring to FIG. 11, a color image forming apparatus 60 has multi-beam scanning apparatuses 71, 72, 73 and 74 each having any one of the arrangements shown in the first to third embodiments, photosensitive drums 21, 22, 23 and 24 serving as image carriers, developing units 31, 32, 33 and 34, and a conveyor belt 51.

Referring to FIG. 11, the color image forming apparatus 60 receives color signals of R (red), G (green), and B (blue) from an external device 52 such as a personal computer. These color signals are converted into image data (dot data) of C (cyan), M (magenta), Y (yellow), and B (black) by a printer controller 53 in the apparatus. These image data are input to the multi-beam scanning apparatuses 71, 72, 73, and 74. Light beams 41, 42, 43 and 44 modulated in accordance with the image data exit the multi-beam scanning apparatuses. The photosensitive surfaces of the photosensitive drums 21, 22, 23 and 24 are scanned by the light beams in the main scanning direction.

In the color image forming apparatus of this embodiment, four multi-beam scanning apparatuses (71 72, 73, and 74) are arranged in correspondence with C (cyan), M (magenta), Y (yellow), and B (black) to parallelly record image signals (image information) on the photosensitive drums 21, 22, 23 and 24, thereby printing a color image at a high speed.

In the color image forming apparatus according to this embodiment, as described above, each of the four multi-beam scanning apparatuses 71, 72, 73 and 74 forms the latent image of a corresponding color on a corresponding one of the photosensitive drums 21 22, 23 and 24 using a light beam based on the image data. After that, the image data are multiple-transferred to a recording member, thereby forming one full-color image.

As the external device 52, for example, a color image reading apparatus having a CCD sensor may be used. In this case, the color image reading apparatus and color image forming apparatus 60 form a color digital copying machine.

According to the present invention, a multi-beam scanning apparatus in which a smooth member having a small unevenness difference is used for the edge of a BD slit or the edge of a BD sensor, which serves as a synchronization position determination means, thereby always obtaining a satisfactory image without any jitter, and an image forming apparatus using the multi-beam scanning apparatus can be achieved.

In addition, a multi-beam scanning apparatus in which the light-shielding wall of the synchronization position determination means is formed from a smooth member smoother than the basic member, thereby easily forming a smooth synchronization position determination means, and an image forming apparatus using the multi-beam scanning apparatus can be achieved.

What is claimed is:

1. A multi-beam scanning apparatus comprising:
light source means for emitting a plurality of light beams;
deflection means;
scanning optical means for imaging the plurality of light beams deflected by said deflection means on a scanning surface;
synchronization detecting means; and
synchronization detection optical means for guiding each of the plurality of light beams deflected by said deflection means to said synchronization detecting means,
wherein said synchronization detecting means comprises synchronization position determination means for determining a timing of synchronization detection, and
wherein letting Lm (mm) be a main-scanning unevenness difference of said synchronization position determination means, and Am (dpi) be a main-scanning pixel density on the scanning surface, a condition given by $Lm \leq 25.4/Am/3$ is satisfied.

2. A multi-beam scanning apparatus comprising:
light source means for emitting a plurality of light beams;
deflection means;
scanning optical means for imaging the plurality of light beams deflected by said deflection means on a scanning surface;
synchronization detecting means; and
synchronization detection optical means for guiding each of the plurality of light beams deflected by said deflection means to said synchronization detecting means,
wherein said synchronization detecting means comprises synchronization position determination means for determining a timing of synchronization detection, and
wherein letting fk (mm) be a main-scanning focal length of said scanning optical means, fb (mm) be a main-scanning focal length of said synchronization detection optical means, Lm (mm) be a main-scanning unevenness difference of said synchronization position determination means, and Am (dpi) be a main-scanning pixel density on the scanning surface, a condition given by $Lm \leq (25.4/Am/3) \times (fb/fk)$ is satisfied.

3. An apparatus according to claim 2, wherein said synchronization detection optical means includes an optical element having an anamorphic condensing function.

4. An apparatus according to claim 1, wherein letting Ls (mm) be a sub-scanning unevenness pitch of said synchronization position determination means, and Ws (mm) be a sub-scanning spot diameter of the light beam on said synchronization position determination means, a condition given by $Ls \leq Ws/3$ is satisfied.

5. An image forming apparatus comprising:
said multi-beam scanning apparatus of claim 1;
a photosensitive body arranged on the target scanning surface;
a developing unit which develops, as a toner image, an electrostatic latent image formed on said photosensitive body by the light beam scanned by said multi-beam scanning apparatus;
a transfer unit which transfers the developed toner image on a target transfer material; and
a fixing unit which fixes the transferred toner image on the target transfer material.

6. An image forming apparatus comprising:
said multi-beam scanning apparatus of claim 1; and
a printer controller which converts code data input from an external device into an image signal and inputs the image signal to said multi-beam scanning apparatus.

7. A color image forming apparatus comprising:
a plurality of multi-beam scanning apparatuses each comprising said multi-beam scanning apparatus of claim 1; and
a plurality of image carriers respectively arranged on target scanning surfaces of said multi-beam scanning apparatuses to form images of different colors.

8. An apparatus according to claim 7, further comprising a printer controller which converts color signals input from an external device into image data of different colors and inputs the image data to said multi beam scanning apparatuses.

9. An image forming apparatus comprising:

said multi-beam scanning apparatus of claim 2;

a photosensitive body arranged on the target scanning surface;

a developing unit which develops, as a toner image, an electrostatic latent image formed on said photosensitive body by the light beam scanned by said multi-beam scanning apparatus;

a transfer unit which transfers the developed toner image on a target transfer material; and a fixing unit which fixes the transferred toner image on the target transfer material.

10. An image forming apparatus comprising:

said multi-beam scanning apparatus of claim 2; and a printer controller which converts code data input from an external device into an image signal and inputs the image signal to said multi-beam scanning apparatus.

11. A color image forming apparatus comprising:

a plurality of multi-beam scanning apparatuses each comprising said multi-beam scanning apparatus of claim 2; and a plurality of image carriers respectively arranged on target scanning surfaces of said multi-beam scanning apparatuses to form images of different colors.

12. An apparatus according to claim 11, further comprising a printer controller which converts color signals input from an external device into image data of different colors and inputs the image data to said multi-beam scanning apparatuses.

* * * * *